US006297860B1

(12) United States Patent
Moskovich

(10) Patent No.: US 6,297,860 B1
(45) Date of Patent: Oct. 2, 2001

(54) PARTIAL COLOR-CORRECTED PROJECTION LENS SYSTEM

(75) Inventor: Jacob Moskovich, Cincinnati, OH (US)

(73) Assignee: Corning Precision Lens, Cincinnati, OH (US)

( * ) Notice: Subject to any disclaimer, the term of this patent is extended or adjusted under 35 U.S.C. 154(b) by 0 days.

(21) Appl. No.: 09/171,870

(22) PCT Filed: Apr. 28, 1997

(86) PCT No.: PCT/US97/07685

§ 371 Date: Oct. 27, 1998

§ 102(e) Date: Oct. 27, 1998

(87) PCT Pub. No.: WO97/41477

PCT Pub. Date: Nov. 6, 1997

Related U.S. Application Data

(60) Provisional application No. 60/016,448, filed on Apr. 29, 1996.

(51) Int. Cl.[7] ....................................................... H04N 9/31
(52) U.S. Cl. ........................... 348/781; 359/649; 359/650; 359/781; 359/770
(58) Field of Search ..................................... 348/744, 776, 348/778, 781, 784; 359/649, 708, 781, 650, 756, 763, 771, 770; H04N 5/74, 9/31

(56) References Cited

U.S. PATENT DOCUMENTS

| 4,682,862 | * | 7/1987 | Moskovich . |
| 4,697,892 | * | 10/1987 | Betensky . |
| 4,755,028 | * | 7/1988 | Moskovich . |
| 4,776,681 | * | 10/1988 | Moskovich . |
| 4,963,007 | * | 10/1990 | Moskovich . |
| 5,251,063 | * | 10/1993 | Baumann . |
| 5,309,283 |   | 5/1994 | Krietzer ............................ 348/781 |
| 5,329,363 |   | 7/1994 | Moskovich ........................ 348/781 |
| 5,936,776 | * | 8/1999 | Kreitzer . |
| 6,141,154 | * | 10/2000 | Kreitzer . |

FOREIGN PATENT DOCUMENTS 764 865 * 3/1997 (EP) .

* cited by examiner

*Primary Examiner*—Sherrie Hsia
(74) *Attorney, Agent, or Firm*—Maurice M. Klee

(57) ABSTRACT

Projection lens systems (13) for use in projection televisions are provided. The systems are characterized by a screen side lens unit (U1) which: (1) has a weak optical power; (2) has a negative, aspherical lens element composed of a high dispersion material; and (3) has a positive lens element which is composed of a low dispersion material.

9 Claims, 4 Drawing Sheets

PARTIAL COLOR-CORRECTED PROJECTION LENS SYSTEM

CROSS REFERENCE TO RELATED APPLICATIONS

This is the U.S. national phase of International Application No. PCT/US97/07685, filed Apr. 28, 1997, which was published on Nov. 6, 1997 as WO97/41477. This application claims the benefit under 35 USC § 119(e) of U.S. Provisional Application No. 60/016,448, filed Apr. 29, 1996, the contents of which in its entirety is hereby incorporated by reference.

BACKGROUND OF THE INVENTION

1. Field of the Invention

This invention relates to a wide field of view high numerical aperture lens systems with partial color correction for use in projection televisions and, in particular, in projection televisions employing cathode ray tubes (CRTs).

2. Description of the Prior Art

Prior art projection lenses for CRT projection televisions have comprised, from the long conjugate to the short conjugate, a weak aspherical corrector followed by a strong positive power unit, another weak aspherical corrector, and a strong negative power element in close proximity to the CRT. A description of this lens configuration can be found in a number of prior patents, including Betensky, U.S. Pat. No. 4,697,892, and Moskovich, U.S. Pat. Nos. 4,682,862, 4,755,028, and 4,776,681.

To achieve correction of chromatic aberrations, a color correcting doublet is often included in the strong positive power unit. U.S. Pat. No. 4,963,007 describes a lens configuration where color correction is achieved by adding negative power, high dispersion elements to both front units. In these lens forms, the glass elements and the shape of the plastic elements have resulted in higher manufacturing costs.

SUMMARY OF THE INVENTION

The lens systems of the invention provide means to achieve a partial correction of chromatic aberrations with a minimal increase in the difficulty and cost of manufacturing the lens. The lenses preferably comprise, from the long conjugate to the short conjugate, a weak power unit including at least one negative aspherical element of a high dispersion material followed closely by a positive aspherical element of a low dispersion material, a second strong positive power unit providing most of the power of the lens, followed by a weak power aspherical element and a strong negative power element in close proximity to the CRT on the short conjugate of the lens.

In the above described form of the lens, the first unit carries the burden of correction for pupil dependent aberrations like spherical aberration and coma. To correct for overcorrected spherical contributions coming from the power unit of the lens, the surfaces of the first unit take shapes which provide for increased negative power towards the edges of the lens. The use of even a weak power aspherical negative element made out of a high dispersion material in combination with a positive element of low dispersion material in the first unit significantly improves the correction of chromatic aberrations at the full aperture of the lens. It should be noted that having a negative element followed by a positive element allows the necessary correction of aberrations to be achieved with both elements having a fairly small variation in element thickness as a function of the diameter of the lens, thus providing shapes for these elements which are suitable for high volume manufacturing.

The invention thus provides a high speed wide field of view projection lens systems comprising in order from the long conjugate to the short conjugate:

a weak power aspherical corrector unit, a strong power unit providing most of the positive power of the lens, a weak power aspherical unit, and a strong negative power unit close to the short conjugate of the lens and providing most of the correction to the field curvature of the lens, where the corrector unit includes a negative power aspherical element of high dispersion material followed closely by a positive power element of low dispersion material. In certain embodiments, the positive power element may be aspherical.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As used herein, a high dispersion material is one having a dispersion like that of flint glass. More particularly, a high dispersion material is one having a V-value ranging from 20 to 50 for an index of refraction in the range from 1.85 to 1.5, respectively. In contrast, a low dispersion material is one having a dispersion like that of crown glass or, in terms of V-values, one having a V-value ranging from 35 to 75 for an index of refraction in the range from 1.85 to 1.5, respectively.

Figure 1:
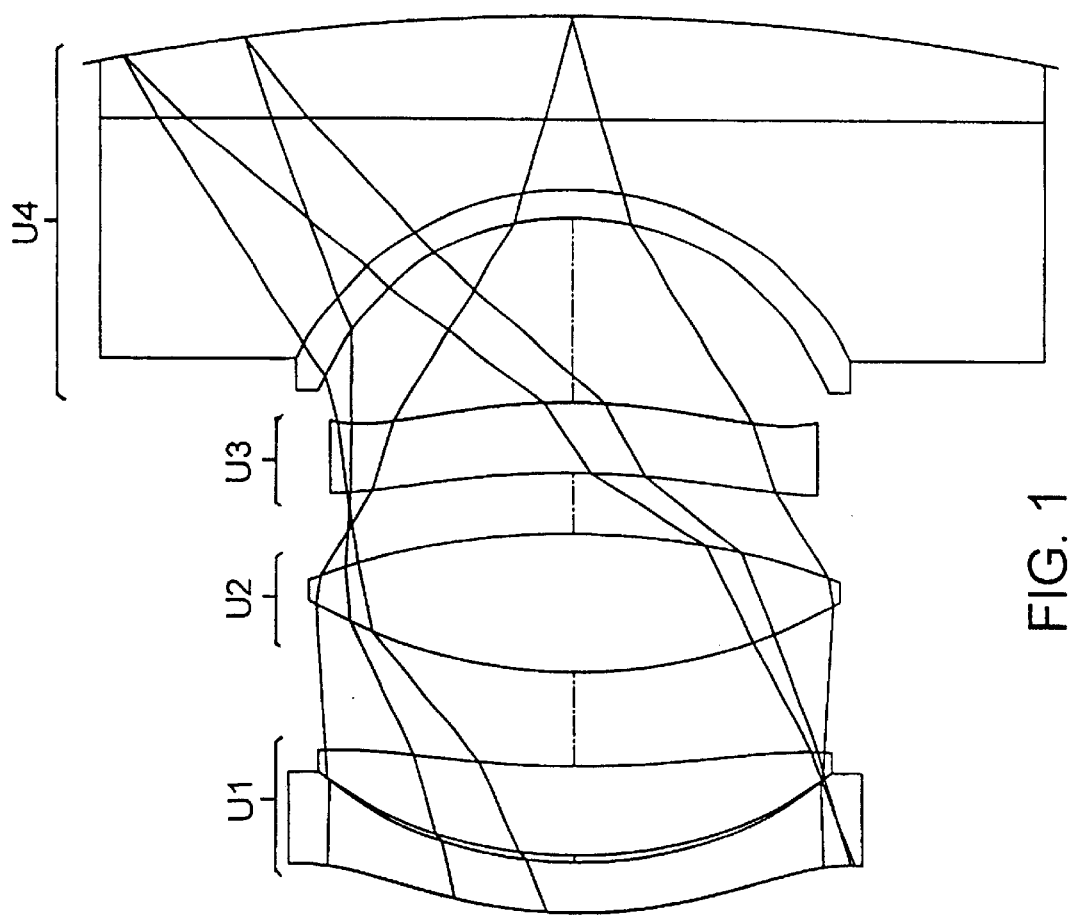
FIGS. 1, 2, and 3 are schematic side views of lens systems constructed in accordance with the invention.
Figure 2:
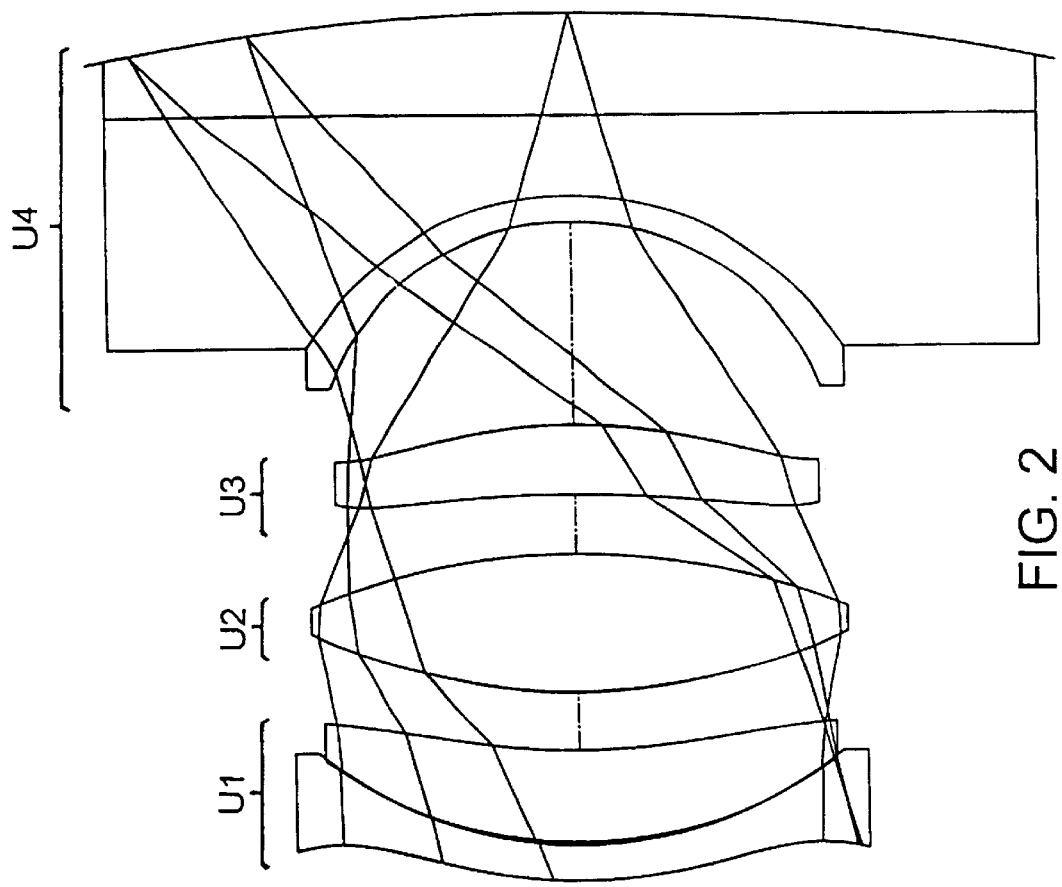
Figure 3:
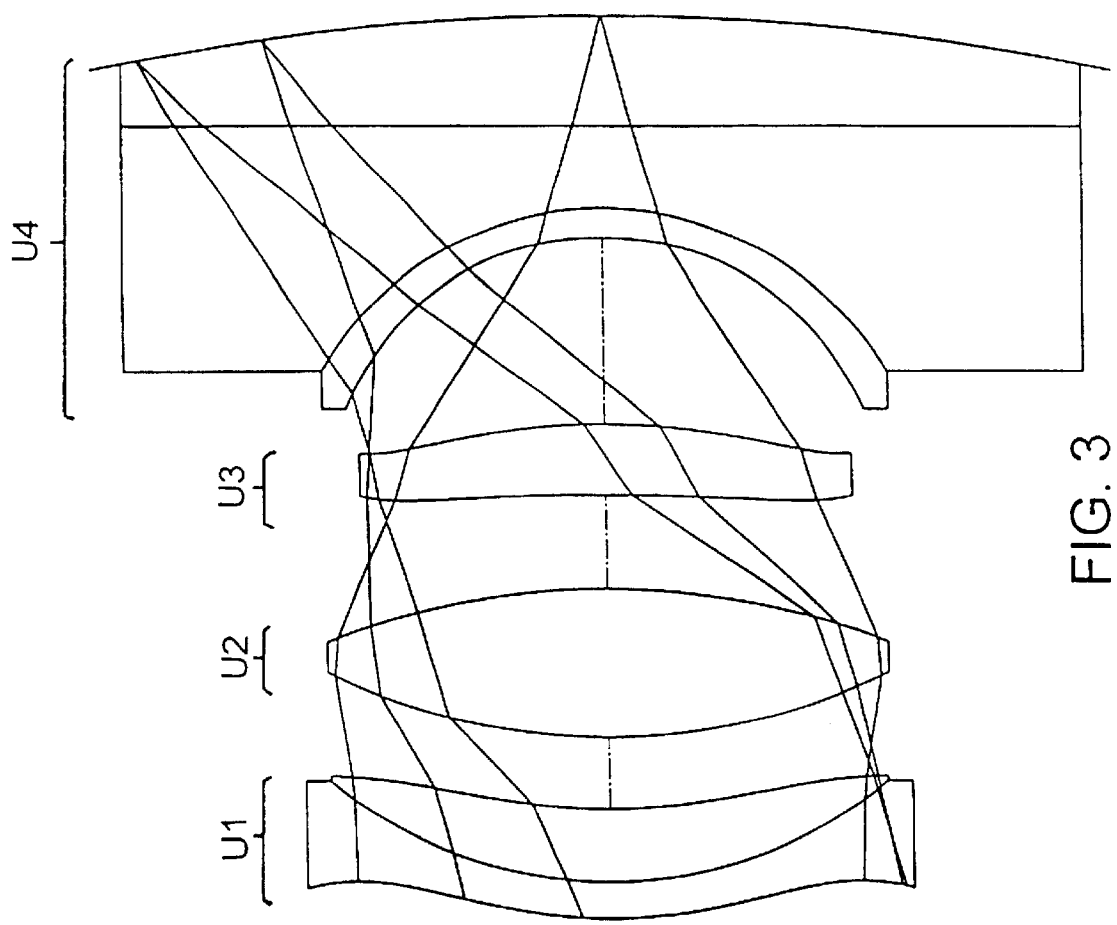

FIGS. 1 to 3 illustrate various lens systems constructed in accordance with the invention. Corresponding prescriptions and optical properties appear in Tables 1 to 3, respectively. HOYA or SCHOTT designations are used for the glasses employed in the lens systems. Equivalent glasses made by other manufacturers can be used in the practice of the invention. Industry acceptable materials are used for the styrene and acrylic elements. Material designations of the form "xxxxxx" are used to represent the index of refraction and dispersion characteristics of the CRT and of the coupling fluid between the last element of the lens system and the CRT. Specifically, a Ne value for the material is obtained by adding 1.000 to the first three digits of the designation, and a $V_e$ value is obtained from the last three digits by placing a decimal point before the last digit.

The aspheric coefficients set forth in the tables are for use in the following equation:

$$z = \frac{cy^2}{1 + [1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant.

The designation "a" associated with various surfaces in the tables represents an aspheric surface, i.e., a surface for which at least one of D, E, F, G, H, or I in the above equation is not zero. The designation "c" represents a conic surface for which the k value in the above equation is not zero. Surface 7 in Table 1, surfaces 5 and 8 in Table 2, and surfaces 4 and 7 in Table 3 are optional vignetting surfaces. All dimensions given in the tables are in millimeters. The tables are constructed on the assumption that light travels from left to right in the figures. In actual practice, the CRT is on the right and the viewing screen is on the left, and light travels from right to left.

Figure 4:
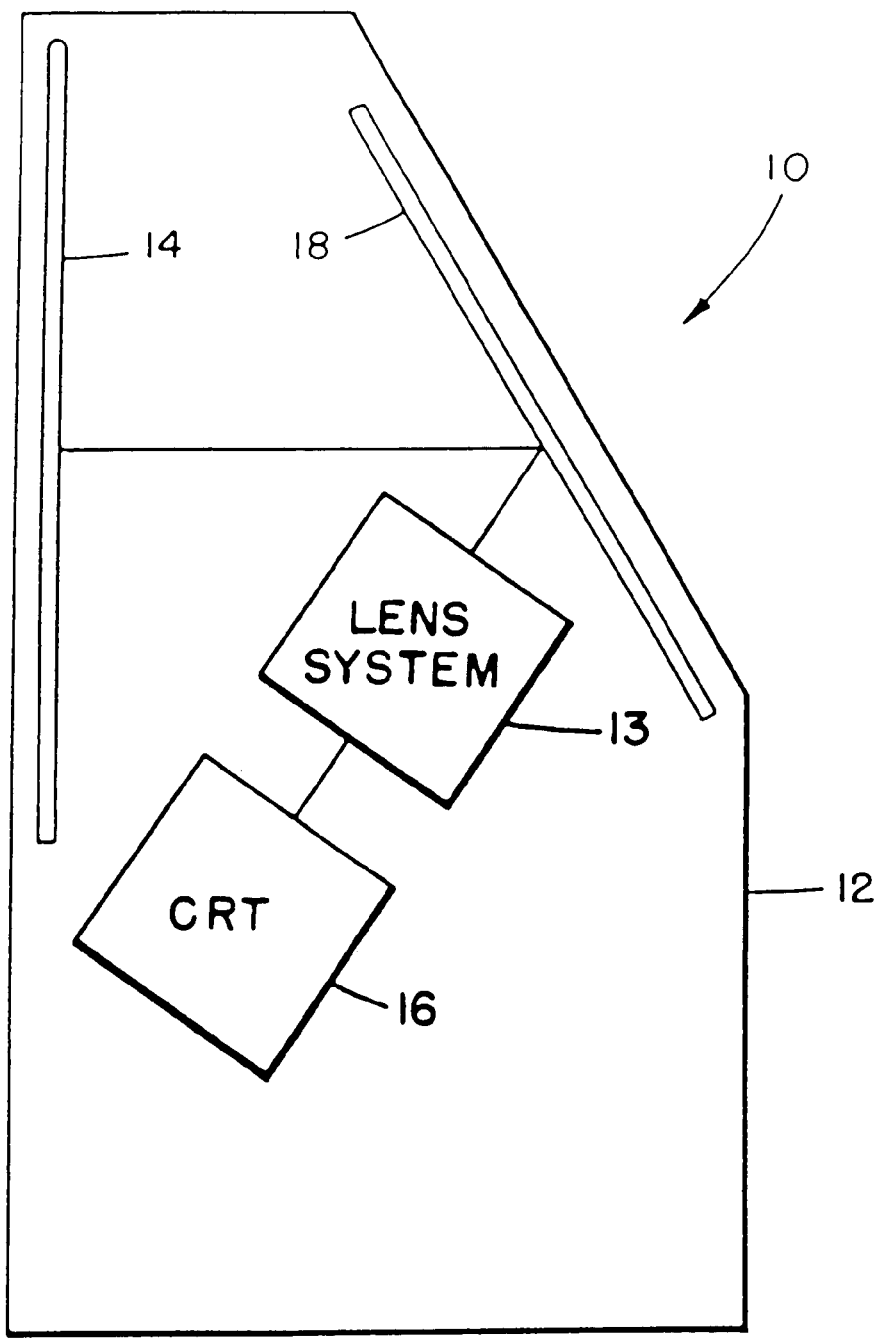
FIG. 4 is a schematic diagram of a projection TV employing a lens system constructed in accordance with the invention.

FIG. 4 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a lens system constructed in accordance with the invention and module 16 illustrates its associated CRT tube. In practice, three lens systems 13 and three CRT tubes 16 are used to project red, green, and blue images onto screen 14. The diagram of FIG. 4 is for a rear projection television. The lens systems of the invention can also be used with front projection televisions, which have a similar construction except that mirror 18 is not used.

The correspondence between the lens units discussed above and the various elements and surfaces of the lenses of Tables 1–3 is set forth in the upper half of Table 4. Specifically, "Unit 1" is the weak power aspherical corrector unit, "Unit 2" is the strong power unit providing most of the positive power of the lens, "Unit 3" is the weak power aspherical unit on the short conjugate side of Unit 2, and "Unit 4" is the strong negative power unit at the short conjugate side of the lens.

In Table 4, the CRT faceplate and the coupling fluid between the faceplate and the lens system have been included in Unit 4 since these components affect the optical performance of the lens system when incorporated into a projection television system. In practice, the lens systems of the invention are typically provided to the manufacturers of projection televisions separate from these components. The claims set forth below are intended to cover the lens systems of the invention both as provided to such manufacturers and after assembly into a projection television system.

The lower half of Table 4 sets forth the focal lengths of Units 1–4, i.e., f1 to f4, respectively, as well as the overall focal length of the lens system (f0), all of which have been determined from Tables 1–3. As can be seen in Table 4, the |f1|/f0, f2/f0, |f3|/f0, and |f4|/f0 ratios for the lens systems of the invention satisfy the following relationships:

|f1|/f0>2.5;

f2/f0<1.25;

|f3|/f0>2.0; and

|f4|/f0>1.4.

As can be seen from, for example, FIGS. 1–3, the first and second lens elements of the aspherical corrector lens unit are closely spaced. In particular, the distance between these elements is less than two percent of the focal length of the lens system (see Table 1).

As can also be seen from, for example, FIGS. 1–3, the lens elements making up the aspherical corrector lens unit (Unit 1) have a small variation in element thickness as a function of the diameter of the lens. In particular, the ratio of $T_{max}$ to $T_{min}$ for these lens elements is less than about 3.0, where $T_{max}$ is the maximum thickness of the lens element over its clear aperture and $T_{min}$ is the minimum thickness, again over the clear aperture.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

Lens Data

| Surf. No. | Type | Radius | Thickness | Glass | Clear Aperture Diameter |
|---|---|---|---|---|---|
| 1 | a | 70.4152 | 7.00000 | STYRENE | 79.27 |
| 2 | c | 61.4990 | 1.00352 | | 70.78 |
| 3 | c | 65.2526 | 13.00000 | ACRYLIC | 70.85 |
| 4 | a | 144.1335 | 12.89880 | | 70.74 |
| 5 | | 75.8167 | 20.00000 | SK5 | 73.33 |
| 6 | | −105.1768 | 0.20000 | | 71.98 |
| 7 | | ∞ | 8.60337 | | 64.20 |
| 8 | a | −125.8289 | 10.00000 | ACRYLIC | 64.57 |
| 9 | a | −95.7773 | Space 1 | | 67.11 |
| 10 | a | −44.4784 | 4.00000 | ACRYLIC | 70.44 |
| 11 | | −44.0000 | 10.00000 | 423500 | 76.50 |
| 12 | | ∞ | 14.60000 | 563500 | 120.00 |
| 13 | | −350.0000 | Image distance | | 130.00 |

Symbol Description
  a - Polynomial asphere
  c - Conic section
Object and Image Surface
  Surface  Radius
  Image  −350.0000
Conics
  Surface
  Number  Constant
  2  6.3398E−01
  3  7.0767E−01

Even Polynomial Aspheres

| Surf. No. | D | E | F |
|---|---|---|---|
| 1 | −1.0861E−06 | −4.6061E−10 | −1.6847E−13 |
| 4 | −6.3055E−07 | −7.9726E−10 | −5.8507E−14 |
| 8 | 4.4531E−07 | −1.0971E−09 | 4.4062E−12 |
| 9 | 5.5645E−07 | 3.3468E−09 | −6.0536E−12 |
| 10 | −5.7493E−06 | 1.3479E−08 | −3.1054E−11 |

| Surf. No. | G | H | I |
|---|---|---|---|
| 1 | −7.9765E−17 | 6.5207E−29 | −8.3615E−24 |
| 4 | 1.6704E−17 | 2.9988E−19 | −1.5254E−22 |
| 8 | −4.4536E−15 | 2.2309E−18 | −4.9618E−22 |
| 9 | 9.1895E−15 | −6.3376E−18 | 1.6546E−21 |
| 10 | 3.6189E−14 | −2.0704E−17 | 4.4979E−21 |

Variable Spaces

| Zoom Pos. | Space 1 T(9) | Focal Shift | Image Distance |
|---|---|---|---|
| 1 | 26.426 | −0.615 | 0.000 |
| 2 | 25.686 | −0.223 | 0.000 |

TABLE 1-continued

First-Order Data

| | Zoom Position | |
|---|---|---|
| | 1 | 2 |
| f/number | 1.23 | 1.21 |
| Magnification | −0.1074 | −0.0895 |
| Object Height | −635.00 | −762.00 |
| Object Distance | −797.27 | −946.72 |
| Effective Focal Length | 77.330 | 77.819 |
| Image Distance | 0.00 | 0.00 |
| Overall Length | 925.00 | 1073.7 |
| Forward Vertex Distance | 127.73 | 126.99 |
| Barrel Length | 127.73 | 126.99 |
| Stop Surface Number | 5 | 5 |
| Distance to Stop | −4.67 | −4.67 |
| Stop Diameter | 77.872 | 77.482 |
| Entrance Pupil Distance | 28.218 | 28.218 |
| Exit Pupil Distance | −64.533 | −64.171 |

First Order Properties of Elements

| Element Number | Surface Numbers | Power | f′ | Ipp | I′pp |
|---|---|---|---|---|---|
| 1 | 1  2 | −0.86623E−03 | −1154.4 | 49.015 | 42.808 |
| 2 | 3  4 | 0.43669E−02 | 228.99 | −6.8273 | −15.080 |
| 3 | 5  6 | 0.12873E−01 | 77.685 | 5.4898 | −7.6158 |
| 4 | 8  9 | 0.13667E−02 | 731.68 | 25.253 | 19.222 |
| 5 | 10  11 | 0.45430E−03 | 2201.2 | 66.146 | 65.435 |
| 6 | 11  12 | −0.96136E−02 | −104.02 | 0.20995E−07 | −7.0274 |
| 7 | 12  13 | 0.16086E−02 | 621.67 | 9.3410 | 0.67400E−06 |

First-Order Properties of Doublets

| Element Numbers | Surface Numbers | Power | f′ | Ipp | I′pp |
|---|---|---|---|---|---|
| 5  7 | 10  13 | −0.75400E−02 | −132.63 | −4.6195 | −24.447 |

First Order Properties of the Lens

| Zoom Position Number | Power | f′ | Ipp | I′pp |
|---|---|---|---|---|
| 1 | 0.12932E−01 | 77.330 | 0.35091 | −85.017 |
| 2 | 0.12850E−01 | 77.819 | 0.58689 | −84.561 |

TABLE 2

Lens Data

| Surf. No. | Type | Radius | Thickness | Glass | Clear Aperture Diameter |
|---|---|---|---|---|---|
| 1 | a | 68.3529 | 5.00000 | STYRENE | 80.79 |
| 2 | a | 60.1983 | 0.50000 | | 74.09 |
| 3 | a | 66.1998 | 13.00000 | ACRYLIC | 74.08 |
| 4 | a | 101.6611 | 3.35577 | | 72.13 |
| 5 | | ∞ | 5.00000 | | 72.34 |
| 6 | | 92.1515 | 20.00000 | SK18 | 75.61 |
| 7 | | −101.3913 | 8.64185 | | 75.03 |
| 8 | | ∞ | 0.100000 | | 67.35 |
| 9 | a | −188.4645 | 10.00000 | ACRYLIC | 68.00 |
| 10 | a | −83.2324 | Space 1 | | 66.09 |
| 11 | a | −48.8548 | 4.00000 | ACRYLIC | 69.04 |
| 12 | | −45.0000 | 11.50000 | 447500 | 75.69 |
| 13 | | ∞ | 14.60000 | 563500 | 120.00 |
| 14 | | −350.0000 | Image distance | | 130.00 |

Symbol Description
  a - Polynomial asphere
Object and Image Surface
  Surface  Radius
  Image    −350.0000

TABLE 2-continued

Even Polynomial Aspheres

| Surf. No. | D | E | F |
|---|---|---|---|
| 1 | −1.5682E−06 | −8.8872E−10 | −4.0656E−13 |
| 2 | −1.2788E−09 | −3.0172E−12 | −5.7082E−15 |
| 3 | 5.5753E−08 | 1.0686E−10 | 1.6634E−13 |
| 4 | −8.3683E−07 | −9.8124E−10 | 1.0071E−13 |
| 9 | −1.8654E−07 | −1.4606E−10 | 3.3020E−12 |
| 10 | −1.7405E−07 | 2.6987E−09 | −5.4255E−12 |
| 11 | −7.2604E−06 | 1.3847E−08 | −3.01488E−11 |

| Surf. No. | G | H | I |
|---|---|---|---|
| 1 | 4.1805E−17 | 1.7413E−19 | −4.5166E−23 |
| 2 | −6.9688E−18 | −6.8894E−21 | −4.5975E−24 |
| 3 | 2.2197E−17 | −3.0723E−20 | −4.5797E−23 |
| 4 | 1.2402E−16 | 2.2547E−19 | −1.2612E−22 |
| 9 | −4.3894E−15 | 2.7316E−18 | −5.1357E−22 |
| 10 | 8.6440E−15 | −6.7446E−18 | 2.2054E−21 |
| 11 | 3.5523E−14 | −2.1416E−17 | 4.9592E−21 |

Variable Spaces

| Zoom Pos. | Space 1 T(10) | Focal Shift | Image Distance |
|---|---|---|---|
| 1 | 29.416 | −0.371 | 0.000 |
| 2 | 28.715 | 0.031 | 0.000 |

First-Order Data

| | Zoom Position | |
|---|---|---|
| | 1 | 2 |
| f/number | 1.20 | 1.19 |
| Magnification | −0.1074 | −0.0895 |
| Object Height | −635.00 | −762.00 |
| Object Distance | −769.89 | −914.10 |
| Effective Focal Length | 74.918 | 75.344 |
| Image Distance | 0.16716E−03 | 0.00 |
| Overall Length | 895.00 | 1038.5 |
| Forward Vertex Distance | 125.11 | 124.41 |
| Barrel Length | 125.11 | 124.41 |
| Stop Surface Number | 6 | 6 |
| Distance to Stop | 7.97 | 7.97 |
| Stop Diameter | 75.631 | 74.840 |
| Entrance Pupil Distance | 29.824 | 29.824 |
| Exit Pupil Distance | −62.758 | −62.378 |

First Order Properties of Elements

| Element Number | Surface Numbers | Power | f′ | Ipp | I′pp |
|---|---|---|---|---|---|
| 1 | 1  2 | −0.90939E−03 | −1099.6 | 34.070 | 30.005 |
| 2 | 3  4 | 0.29171E−02 | 342.81 | −14.491 | −22.253 |
| 3 | 6  7 | 0.12748E−01 | 78.447 | 6.0460 | −6.6523 |
| 4 | 9  10 | 0.34166E−02 | 292.69 | 11.624 | 5.1336 |
| 5 | 11  12 | 0.11628E−02 | 860.02 | 25.270 | 23.276 |
| 6 | 12  13 | −0.99422E−02 | −100.58 | 0.42949E−07 | −7.9453 |
| 7 | 13  14 | 0.16086E−02 | 621.67 | 9.3410 | 0.67400E−06 |

First-Order Properties of Doublets

| Element Numbers | Surface Numbers | Power | f′ | Ipp | I′pp |
|---|---|---|---|---|---|
| 5  7 | 11  14 | −0.71448E−02 | −139.96 | −4.8702 | −25.680 |

First Order Properties of the Lens

| Zoom Position Number | Power | f′ | Ipp | I′pp |
|---|---|---|---|---|
| 1 | 0.13348E−01 | 74.918 | 2.8513 | −82.590 |
| 2 | 0.13272E−01 | 75.344 | 3.0752 | −82.118 |

TABLE 3

Lens Data

| Surf. No. | Type | Radius | Thickness | Glass | Clear Aperture Diameter |
|---|---|---|---|---|---|
| 1 | a | 68.1580 | 5.00000 | STYRENE | 81.45 |
| 2 | | 60.0000 | 10.00000 | ACRYLIC | 74.71 |
| 3 | a | 85.3900 | 4.77696 | | 74.09 |
| 4 | | ∞ | 5.00000 | | 73.94 |
| 5 | | 87.6719 | 20.00000 | SK18 | 75.19 |
| 6 | | −111.6353 | 12.84178 | | 74.26 |
| 7 | | ∞ | 0.10000 | | 65.72 |
| 8 | a | −353.2924 | 10.00000 | ACRYLIC | 65.72 |
| 9 | a | −90.3933 | Space 1 | | 65.33 |
| 10 | a | −45.9840 | 4.00000 | ACRYLIC | 69.30 |
| 11 | | −45.0000 | 11.50000 | 447500 | 75.80 |
| 12 | | ∞ | 14.60000 | 563500 | 120.00 |
| 13 | | −350.0000 | Image distance | | 130.00 |

Symbol Description
  a - Polynomial asphere
Object and Image Surface
  Surface    Radius
  Image     −350.0000

Even Polynomial Aspheres

| Surf. No. | D | E | F |
|---|---|---|---|
| 1 | −1.6137E-06 | −9.3026E-10 | −4.2370E-13 |
| 3 | −9.0208E-07 | −1.4302E-09 | −3.1208E-16 |
| 8 | 5.8996E-08 | −7.7972E-10 | 3.5734E-12 |
| 9 | −3.9337E-08 | 2.5609E-09 | −5.1742E-12 |
| 10 | −6.4458E-06 | 1.3223E-08 | −2.9071E-11 |

| Surf. No. | G | H | I |
|---|---|---|---|
| 1 | 6.9489E-17 | 1.8182E-19 | −5.1822E-23 |
| 3 | 1.4607E-16 | 2.6774E-19 | −1.1444E-22 |
| 8 | −4.0936E-15 | 2.7666E-18 | −6.6880E-22 |
| 9 | 8.6565E-15 | −6.7957E-18 | 2.2546E-21 |
| 10 | 3.5175E-14 | −2.2029E-17 | 5.3207E-21 |

Variable Spaces

| Zoom Pos. | Space 1 T(9) | Focal Shift | Image Distance |
|---|---|---|---|
| 1 | 25.827 | −0.204 | −0.004 |
| 2 | 25.115 | 0.168 | −0.004 |

First-Order Data

| | Zoom Position | |
|---|---|---|
| | 1 | 2 |
| f/number | 1.20 | 1.19 |
| Magnification | −0.1074 | −0.0895 |
| Object Height | −635.00 | −762.00 |
| Object Distance | −771.31 | −916.02 |
| Effective Focal Length | 74.882 | 75.354 |
| Image Distance | −.36822E-02 | −.35942E-02 |
| Overall Length | 894.96 | 1038.9 |
| Forward Vertex Distance | 123.64 | 122.93 |
| Barrel Length | 123.65 | 122.93 |
| Stop Surface Number | 5 | 5 |
| Distance to Stop | 10.18 | 10.18 |
| Stop Diameter | 74.882 | 74.133 |
| Entrance Pupil Distance | 30.279 | 30.279 |
| Exit Pupil Distance | −61.697 | −61.329 |

Wavelengths
  0.54610    0.48000    0.64380    0.43580    0.70652

First Order Properties of Elements

| Element Number | Surface Numbers | Power | f' | Ipp | I'pp |
|---|---|---|---|---|---|
| 1 | 1  2 | −0.91551E-03 | −1092.3 | 33.954 | 29.890 |
| 2 | 2  3 | 0.27656E-02 | 361.59 | −13.997 | −19.921 |
| 3 | 5  6 | 0.12547E-01 | 79.700 | 5.5790 | −7.1039 |
| 4 | 8  9 | 0.41160E-02 | 242.95 | 8.8845 | 2.2732 |
| 5 | 10 11 | 0.55031E-03 | 1817.2 | 53.393 | 52.251 |
| 6 | 11 12 | −0.99422E-02 | −100.58 | 0.42949E-07 | −7.9453 |
| 7 | 12 13 | 0.16086E-02 | 621.67 | 9.3410 | 0.67400E-06 |

First-Order Properties of Doublets

| Element Numbers | Surface Numbers | Power | f' | Ipp | I'pp |
|---|---|---|---|---|---|
| 1 | 2 | 1 | 3 | 0.17390E-02 | 575.06 | −35.843 | −43.026 |
| 5 | 7 | 10 | 13 | −0.77539E-02 | −128.97 | −4.4876 | −25.284 |

First Order Properties of the Lens

| Zoom Position Number | Power | f' | Ipp | I'pp |
|---|---|---|---|---|
| 1 | 0.13354E-01 | 74.882 | 1.0490 | −82.720 |
| 2 | 0.13271E-01 | 75.354 | 1.2798 | −82.269 |

TABLE 4

| Example No. | 1 | 2 | 3 |
|---|---|---|---|
| Unit 1 (Surf. Nos.) | 1 to 4 | 1 to 4 | 1 to 3 |
| Unit 2 (Surf. Nos.) | 5 to 6 | 6 to 7 | 5 to 6 |
| Unit 3 (Surf. Nos.) | 8 to 9 | 9 to 10 | 8 to 9 |
| Unit 4 (Surf. Nos.) | 10 to 13 | 11 to 14 | 10 to 13 |
| f1 | 301.50 | 528.82 | 575.06 |
| f2 | 77.69 | 78.45 | 79.70 |
| f3 | 731.68 | 292.69 | 242.95 |
| f4 | −132.63 | −139.96 | −128.97 |
| f0 | 77.33 | 74.92 | 74.88 |

What is claimed is:

1. A projection lens system for use with a cathode ray tube, said system having an image side and comprising in order from said image side:
   a) a corrector lens unit of weak optical power, said unit comprising in order from said image side:
      i) a first lens element which has a negative power on axis and comprises at least one aspherical surface, said first lens element being composed of a high dispersion material; and
      ii) a second lens element which has a positive power and is composed of a low dispersion material;
   b) a power lens unit providing most of the positive optical power of the lens system;
   c) a lens unit of weak optical power comprising at least one aspherical surface; and
   d) a lens unit which has a strong negative power, is associated with the cathode ray tube during use of the lens system, and provides most of the correction to the field curvature of the lens system.

2. The projection lens system of claim 1 wherein the corrector lens unit has more negative power in the vicinity of the unit's clear aperture than in the vicinity of the system's optical axis.

3. The projection lens system of claim 1 wherein the first and second lens elements are closely spaced.

4. The projection lens system of claim 1 wherein the first lens element has a small variation in thickness over its clear aperture.

5. The projection lens system of claim 1 wherein the second lens element comprises at least one aspherical surface.

6. The projection lens system of claim 5 wherein the second lens element has a small variation in thickness over its clear aperture.

7. The projection lens system of claim 1 wherein the first lens element is composed of styrene and the second lens element is composed of acrylic.

8. A projection television set comprising a cathode ray tube, a screen, and a projection lens system for projecting light from the cathode ray tube onto the screen to form an image, said projection lens system comprising the projection lens system of claim 1.

9. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 1.

\* \* \* \* \*